United States Patent
Yousefpor et al.

(10) Patent No.: US 10,606,418 B2
(45) Date of Patent: Mar. 31, 2020

(54) ULTRASONIC TOUCH DETECTION ON STYLUS

(71) Applicant: Apple Inc., Cupertino, CA (US)

(72) Inventors: Marduke Yousefpor, San Jose, CA (US); Aaron Scott Tucker, Cupertino, CA (US); Brian Michael King, Saratoga, CA (US); Ehsan Khajeh, San Jose, CA (US); Marcus Yip, San Carlos, CA (US); Mohammad Yeke Yazdandoost, San Jose, CA (US); Wesley W. Zuber, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 15/923,967

(22) Filed: Mar. 16, 2018

(65) Prior Publication Data

US 2018/0284946 A1   Oct. 4, 2018

Related U.S. Application Data

(60) Provisional application No. 62/480,174, filed on Mar. 31, 2017.

(51) Int. Cl.
| | | |
|---|---|---|
| *G06F 3/043* | (2006.01) | |
| *G06F 3/0354* | (2013.01) | |
| *G06F 3/044* | (2006.01) | |

(52) U.S. Cl.
CPC ........ *G06F 3/0433* (2013.01); *G06F 3/03545* (2013.01); *G06F 3/044* (2013.01); *G06F 2203/0339* (2013.01)

(58) Field of Classification Search
CPC .... G06F 3/044; G06F 3/0433; G06F 3/03545; G06F 2203/0339
See application file for complete search history.

(56) References Cited

U.S. PATENT DOCUMENTS

| | | | |
|---|---|---|---|
| 3,673,327 A | 6/1972 | Johnson | |
| 4,506,354 A | 3/1985 | Hansen | |
| | (Continued) | | |

FOREIGN PATENT DOCUMENTS

| | | |
|---|---|---|
| JP | 2000-163031 A | 6/2000 |
| JP | 2002-342033 A | 11/2002 |
| WO | 2005103872 A2 | 11/2005 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Charles V Hicks
(74) *Attorney, Agent, or Firm* — Kubota & Basol LLP

(57) ABSTRACT

An input device outfitted with one or more ultrasonic transducers can determine the location of one or more objects in contact with the input device. For example, the input device can include one or more transducers disposed in a ring around the circumference of the input device or in an array of rings along the length of the input device. The ultrasonic transducers can be used to detect the position of the one or more touching objects in at least one dimension, for example. In some examples, the one or more ultrasonic transducers can produce directional ultrasonic waves.

20 Claims, 13 Drawing Sheets

(56) References Cited

U.S. PATENT DOCUMENTS

| | | | |
|---|---|---|---|
| 4,746,914 | A | 5/1988 | Adler |
| 4,825,212 | A | 4/1989 | Adler |
| 5,483,261 | A | 1/1996 | Yasutake |
| 5,488,204 | A | 1/1996 | Mead et al. |
| 5,591,945 | A | 1/1997 | Kent |
| 5,825,352 | A | 10/1998 | Bisset et al. |
| 5,835,079 | A | 11/1998 | Shieh |
| 5,854,450 | A | 12/1998 | Kent |
| 5,880,411 | A | 3/1999 | Gillespie et al. |
| 6,078,315 | A | 6/2000 | Huang |
| 6,091,406 | A | 7/2000 | Kambara |
| 6,188,391 | B1 | 2/2001 | Seely et al. |
| 6,225,985 | B1 | 5/2001 | Armstrong |
| 6,229,529 | B1 | 5/2001 | Yano |
| 6,310,610 | B1 | 10/2001 | Beaton et al. |
| 6,323,846 | B1 | 11/2001 | Westerman et al. |
| 6,327,011 | B2 | 12/2001 | Kim |
| 6,690,387 | B2 | 2/2004 | Zimmerman et al. |
| 6,856,259 | B1 | 2/2005 | Sharp |
| 7,015,894 | B2 | 3/2006 | Morohoshi |
| 7,079,118 | B2 | 7/2006 | Benard |
| 7,098,891 | B1 | 8/2006 | Pryor |
| 7,184,064 | B2 | 2/2007 | Zimmerman et al. |
| 7,218,040 | B2 | 5/2007 | Toda |
| 7,489,308 | B2 | 2/2009 | Blake |
| 7,499,039 | B2 | 3/2009 | Roberts |
| 7,573,466 | B1 | 8/2009 | Marzen |
| 7,663,607 | B2 | 2/2010 | Hotelling et al. |
| 7,907,129 | B2 | 3/2011 | Idzik |
| 8,169,404 | B1 | 5/2012 | Boillot |
| 8,479,122 | B2 | 7/2013 | Hotelling et al. |
| 8,743,091 | B2 | 6/2014 | Bernstein |
| 8,963,890 | B2 | 2/2015 | Raif et al. |
| 9,557,833 | B2 | 1/2017 | Sundara-Rajan et al. |
| 10,126,877 | B1 * | 11/2018 | Lynn ..................... G06F 3/0418 |
| 2004/0164970 | A1 | 8/2004 | Benard |
| 2005/0017959 | A1 | 1/2005 | Kraus |
| 2005/0052432 | A1 | 3/2005 | Kraus |
| 2005/0083313 | A1 | 4/2005 | Hardie-Bick |
| 2005/0248548 | A1 | 11/2005 | Tsumura |
| 2006/0097991 | A1 | 5/2006 | Hotelling et al. |
| 2006/0197753 | A1 | 9/2006 | Hotelling |
| 2007/0211031 | A1 | 9/2007 | Marc |
| 2007/0240913 | A1 | 10/2007 | Schermerhorn |
| 2008/0059761 | A1 | 3/2008 | Norman |
| 2008/0114251 | A1 | 5/2008 | Weymer |
| 2008/0266266 | A1 | 10/2008 | Kent |
| 2010/0026667 | A1 | 2/2010 | Bernstein |
| 2014/0267184 | A1 | 9/2014 | Bathiche et al. |
| 2016/0162048 | A1 | 6/2016 | David |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Feb. 20, 2013, for U.S. Appl. No. 12/184,232, filed Jul. 31, 2008, 24 pages.

Final Office Action dated Aug. 27, 2013, for U.S. Appl. No. 12/184,232, filed Jul. 31, 2008, 25 pages.

Non-Final Office Action dated Nov. 18, 2011, for U.S. Appl. No. 12/184,232, filed Jul. 31, 2008, 21 pages.

Non-Final Office Action dated Jul. 25, 2012, for U.S. Appl. No. 12/184,232, filed Jul. 31, 2008, 18 pages.

Notice of Allowance dated Mar. 14, 2014, for U.S. Appl. No. 12/184,232, filed Jul. 31, 2008, eight pages.

* cited by examiner

ULTRASONIC TOUCH DETECTION ON STYLUS

CROSS-REFERENCE TO RELATED APPLICATIONS

This application claims benefit of U.S. Provisional Patent Application No. 62/480,174, filed Mar. 31, 2017, which is hereby incorporated by reference in its entirety.

FIELD OF THE DISCLOSURE

This relates generally to an input device, and more specifically, to an input device outfitted with one or more ultrasonic transducers configured to determine the location of one or more objects in contact with the input device.

BACKGROUND OF THE DISCLOSURE

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision and control of the stylus. In some instances it may be desirable for input devices, such as styli, to be able to transfer data, in addition to a stimulation signal used to identify touch location, to the touch screen. For example, data from the input devices (such as touch, force, orientation, tilt, or the like) may be communicated to the touch screen, which may use that data to change an output of the display or perform some other operation.

SUMMARY OF THE DISCLOSURE

This relates generally to an input device, and more specifically, to an input device outfitted with one or more ultrasonic transducers configured to determine the location of one or more objects in contact with the input device. In some examples, the input device can include an array of ultrasonic transducers in rows along the length of the input device. In this configuration, the location along the length of the input device of an object touching the input device can be determined based on which ultrasonic transducer(s) detect(s) the object. In some examples, the ultrasonic transducers can also be used to determine the position around the circumference of the input device of an object touching the input device and the location, for example.

In some examples, one or more ultrasonic transducers can be disposed at one end of the input device. A single ultrasonic transducer can determine the location along the length of the input device of an object touching the input device, for example. In some examples, multiple ultrasonic transducers disposed in a ring around one end of the input device can determine the position of the touching object both along the length of the input device and around the circumference of the input device (i.e., in two dimensions).

Some examples of the disclosure relate to generating a directional ultrasonic wave with one or more ultrasonic transducers. For example, one or more ultrasonic transducers can be attached to the input device by way of a wedge. The ultrasonic waves generated by the one or more transducers mounted by way of the wedge can be guided along the surface of the input device based on material properties and/or an angle of the wedge, for example. In some examples, a plurality of ultrasonic transducers can be disposed in an array to produce a guided wave using constructive interference in the direction of wave travel and destructive interference to decrease wave magnitude in the opposite direction.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Figure 1A:
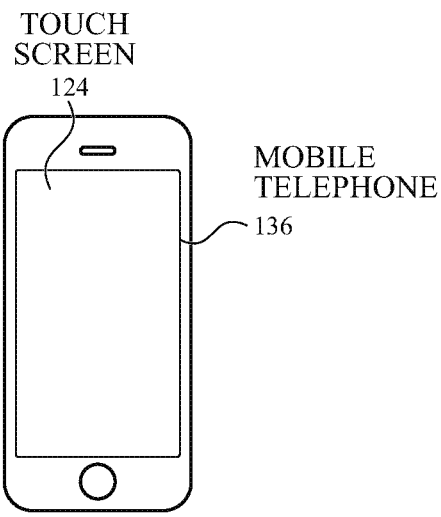
FIGS. 1A-1D illustrate examples of systems with touch screens that can accept input from an active stylus according to examples of the disclosure.
Figure 1B:
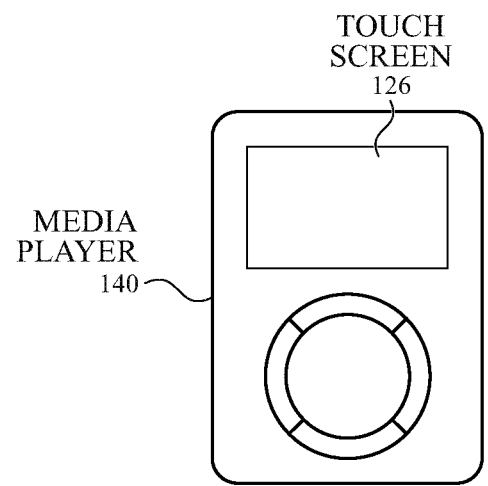
Figure 1C:
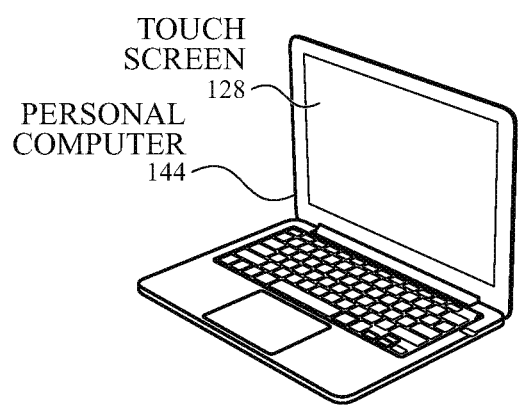
Figure 1D:
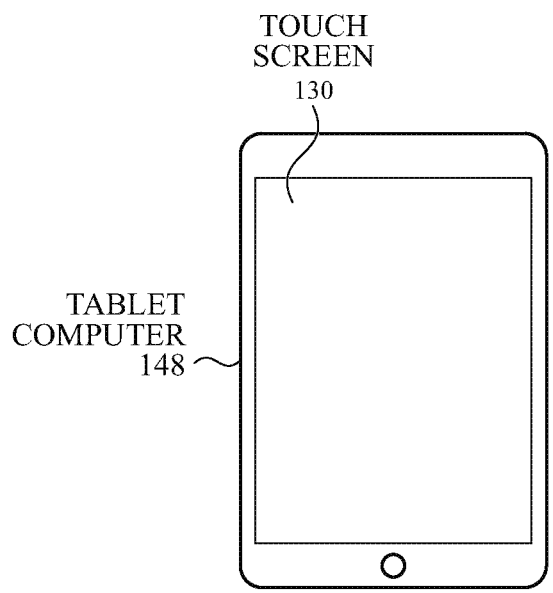

FIGS. 1A-1D illustrate examples of systems with touch screens that can accept input from an active stylus according to examples of the disclosure. FIG. 1A illustrates an exemplary mobile telephone 136 that includes a touch screen 124 that can accept input from an active stylus according to examples of the disclosure. FIG. 1B illustrates an example digital media player 140 that includes a touch screen 126 that can accept input from an active stylus according to examples of the disclosure. FIG. 1C illustrates an example personal computer 144 that includes a touch screen 128 that can accept input from an active stylus according to examples of the disclosure. In some examples, a personal computer 144 can include a trackpad that can accept input from an active stylus according to examples of the disclosure. Although generally described herein with regard to touch screens, active stylus input can be received by touch-sensitive surfaces without a display. FIG. 1D illustrates an example tablet computing device 148 that includes a touch screen 130 that can accept input from an active stylus according to examples of the disclosure. Other devices, including wearable devices, can accept input from an active stylus according to examples of the disclosure.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

In some examples, one or more touch sensors can detect signals from a powered stylus via mutual capacitance. Rather than generating a stimulation signal, the touch sensors can be used to receive coupled charge indicative of the stylus' stimulation signals. As the stylus approaches a touch sensor, charge coupling can occur between a conductive tip of the stylus (which can be driven by the stylus stimulation signal) and the touch sensor. This charge coupling can be received as an AC waveform indicative of stylus presence. In some examples, stylus stimulation signals can be sampled, analyzed, and decoded to receive data encoded in the stylus signal.

Figure 2:
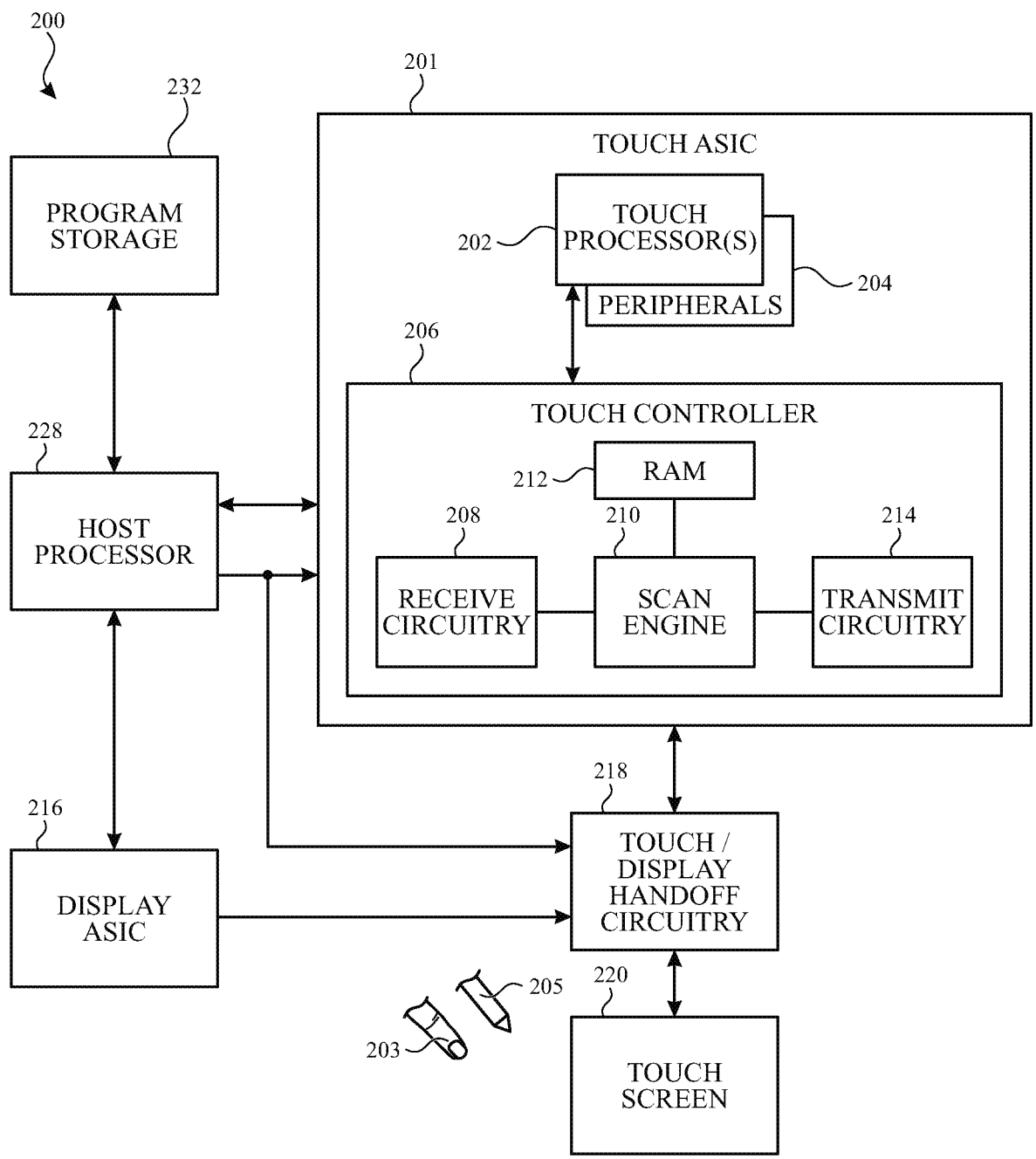
FIG. 2 illustrates a block diagram of an example computing system that can receive input from an active stylus according to examples of the disclosure.

FIG. 2 illustrates a block diagram of an example computing system 200 that can receive input from an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, pixelated sensor array scan, stylus data scan, stylus location scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch/stylus signals or touch/stylus data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, handoff circuitry 218 can also be included in computing system 200. Handoff circuitry 218 can be coupled to the touch ASIC 201, display ASIC 216, and touch screen 220, and can be configured to interface the touch ASIC 201 and display ASIC 216 with touch screen 220. The handoff circuitry 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff circuitry 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or a document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As described herein, host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff controller 218 to properly perform sensing and display functions for an in-cell touch screen. The synchronization signals can be communicated directly from the host processor 228 to one or more of the display ASIC 216, touch ASIC 201 and handoff controller 218. Alternatively, the synchronization signals can be communicated indirectly (e.g., touch ASIC 201 or handoff controller 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies that the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. For example, the active stylus 205 can include one or more sensors and can transmit the sensed data wirelessly. In response to the received data, the computing system can perform an action, such as changing an input mode of the stylus operation. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
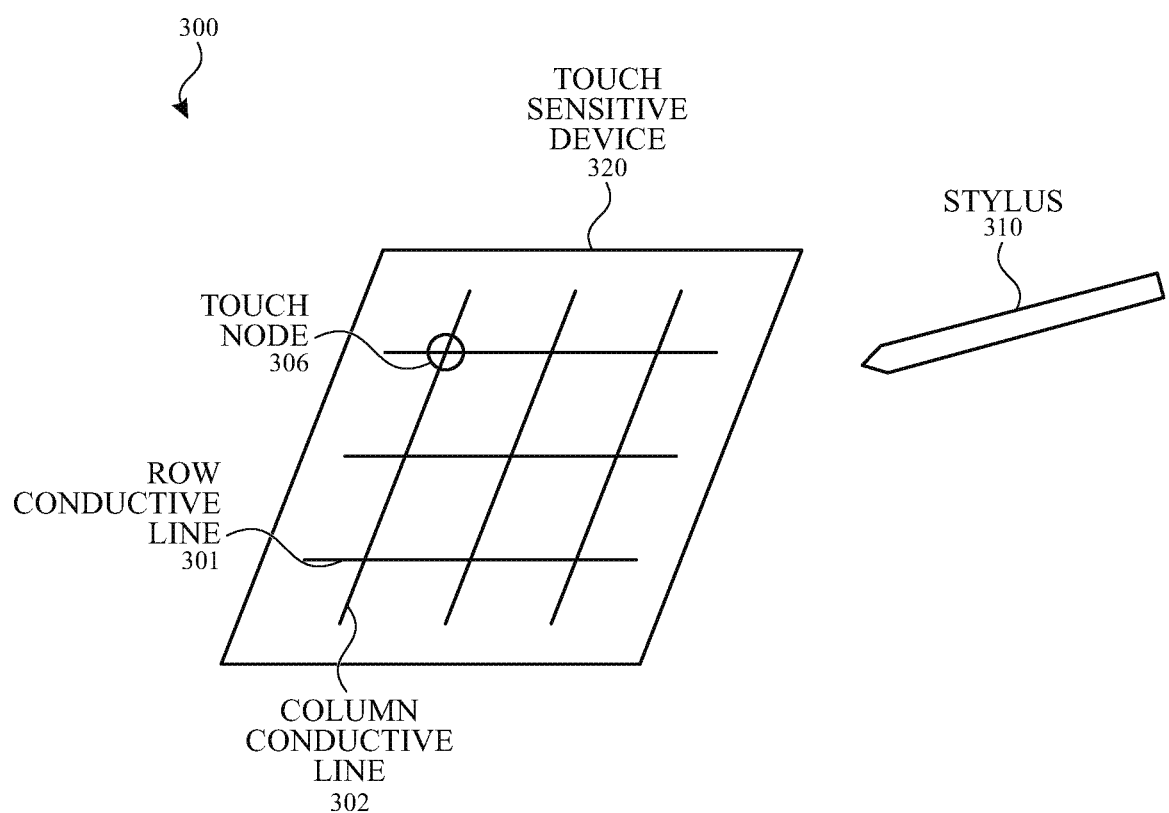
FIG. 3 illustrates an exemplary intelligent stylus for use with a touch sensitive device according to various embodiments.

FIG. 3 illustrates an exemplary intelligent stylus 310 for use with a touch sensitive device 320 according to various embodiments. In the example of FIG. 3, touch sensitive device 320 (e.g., corresponding to the systems illustrated in FIGS. 1A-D) can include an array of touch nodes 306 formed at the crossing points of conductive rows 301 and columns 302. Though FIG. 3 depicts the conductive elements 301, 302 in rows and columns, other configurations of conductive elements are also possible according to various embodiments.

When stylus 310 touches or hovers over a surface of the touch sensitive device 320, the stylus can form a capacitance with one or more of the conductive rows 301 and/or columns 302 that can be detected by device sensing circuitry (not shown). The stylus touch can be represented in an image captured at the touch sensitive device 320 and processed for touch input information, e.g., the location on the touch sensitive device that the stylus touched or hovered over.

In addition to providing the touch input information when touching or in proximity to a touch sensitive device 320, the stylus 310 can provide information sensed by the stylus, which can be used by the touch sensitive device 320 to perform some action. In some embodiments, the information can be used by the stylus to perform some action or the information can be communicated to the touch sensitive device 320 to perform some action. The stylus 310 can include one or more sensors configured to detect one or more objects (e.g., fingers) in contact with the surface of the stylus, for example. Based on the sensor data of the one or more sensors, the touch sensitive device 320 or the stylus 310 can perform some action. The stylus' ability to sense a touch on its surface can allow the stylus to perform operations (or cause operations to be performed by another device in communication with the stylus) beyond touch input information.

Figure 4:
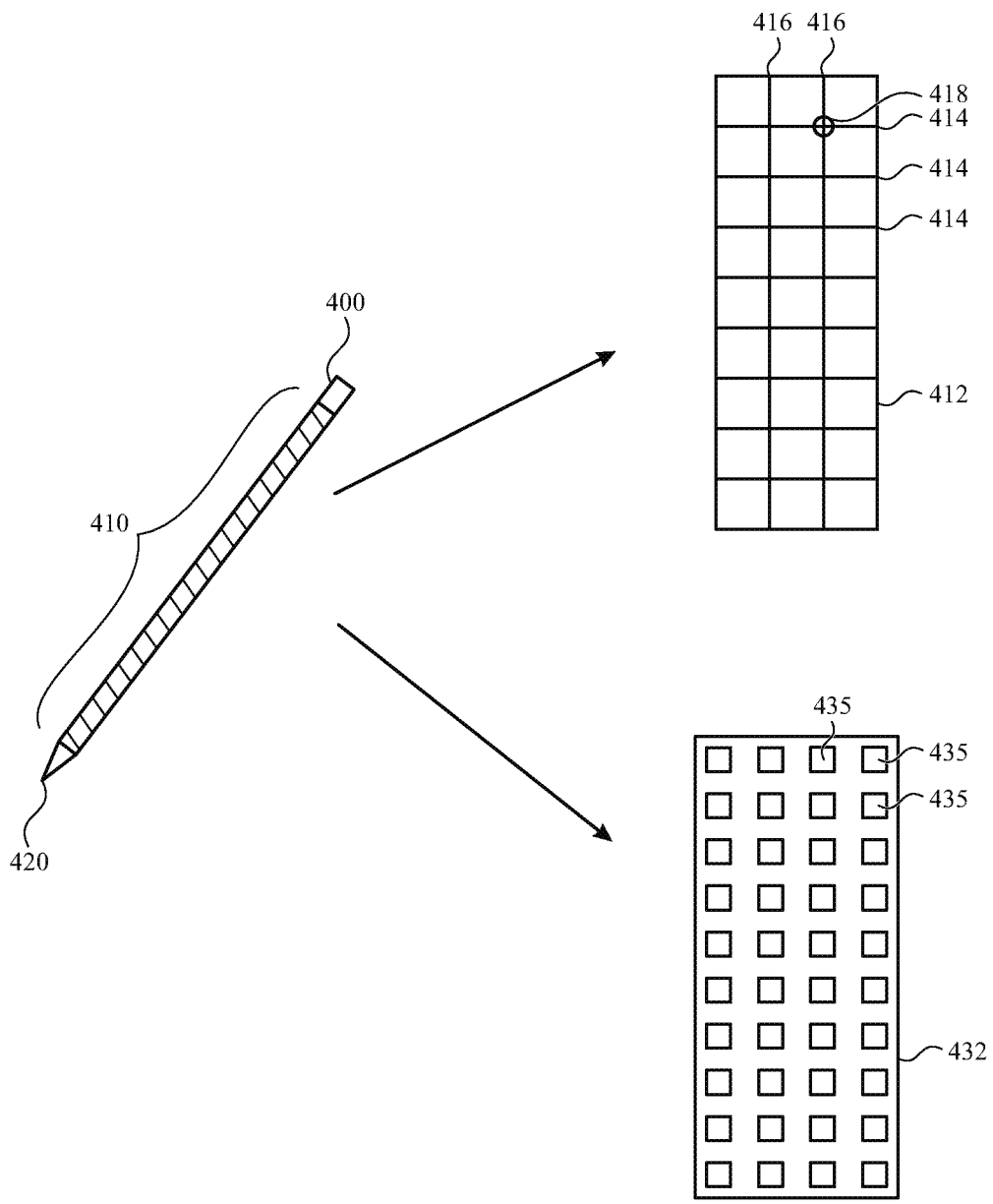
FIG. 4 illustrates an exemplary stylus outfitted with a touch sensitive area along the stylus shaft according to examples of the disclosure.

FIG. 4 illustrates an exemplary stylus 400 outfitted with a touch sensitive area 410 along the stylus shaft according to examples of the disclosure. The touch sensitive area 410 can be an "active area" of the stylus shaft, for example. In some examples, stylus 400 can further include tip 420. In stylus some examples, tip 420 of stylus 400 can include an electrode configured to emit a stimulation signal to be detected by a separate touch-sensitive device (e.g., mobile telephone 136, digital media player 140, personal computer 144, tablet computing device 148, wearable computing device, etc.), for example. In some examples, tip 420 can be conductive and a conductive path can be formed between the tip 420 and a user's hand or fingers to allow for detection of the stylus by a touch sensitive device without the need for the stylus to emit a stimulation signal.

In some examples, touch sensitive area 410 of stylus 400 can include an array of capacitive touch sensors. For ease of description the touch sensitive area 410 can be "unrolled" and viewed as a two-dimensional plane. Touch sensitive area 410 can include an array of capacitive sensors formed by electrodes in a row-column layout 412. Row-column layout 412 can include a plurality of conductive rows 414 and a plurality of conductive columns 416, where the conductive rows and columns can be arranged orthogonally. Touch nodes 418 can be formed at the crossing points of a respective conductive row 414 and a conductive column 416. In some examples, the rows 414 and columns 416 can detect a touch using mutual capacitance or self-capacitance. In essence, the array of capacitive touch sensors can operate generally as described above in the context of touch screens.

In some examples, touch sensitive area 410 can have a pixelated touch electrode layout 432, for example. Pixelated touch electrode layout 432 can include a plurality of conductive electrodes 435 configured to sense a touch. In some examples, each conductive electrode 435 can act as a touch node. The conductive electrodes 435 can detect a touch using self-capacitance or mutual capacitance.

Although stylus 400 can sense a touch at the surface of its shaft at touch sensitive area 410 using either row-column layout 412 or pixelated touch electrode layout 432, in some examples, capacitive touch sensors can require a large number of channels to operate enough sensors to cover touch sensitive section 410, thus requiring a complex controller to sense touch. As styluses can be limited in size for ease of user operation, it can be difficult to incorporate a large and/or heavy controller into a stylus. Minimizing the size and complexity of the controller can save weight and space for the controller itself as well as save weight and space for a battery and/or power supply, as a more complicated controller can use more power than a simpler one uses. Additionally, in some examples, the capacitive sensors can detect objects that are proximate to, but not touching, the touch sensitive section 410 of the stylus 400, making it harder to distinguish the location of multiple touches on the stylus 400. When a user operates a stylus, the user can grip the stylus with several fingers in close proximity to one another. Further, the parts of the fingers that do not contact the shaft of the stylus can still be in close proximity to the stylus' surface. As a result, fingers that are close together can appear as one larger object in contact with the shaft of the stylus.

Figure 5:
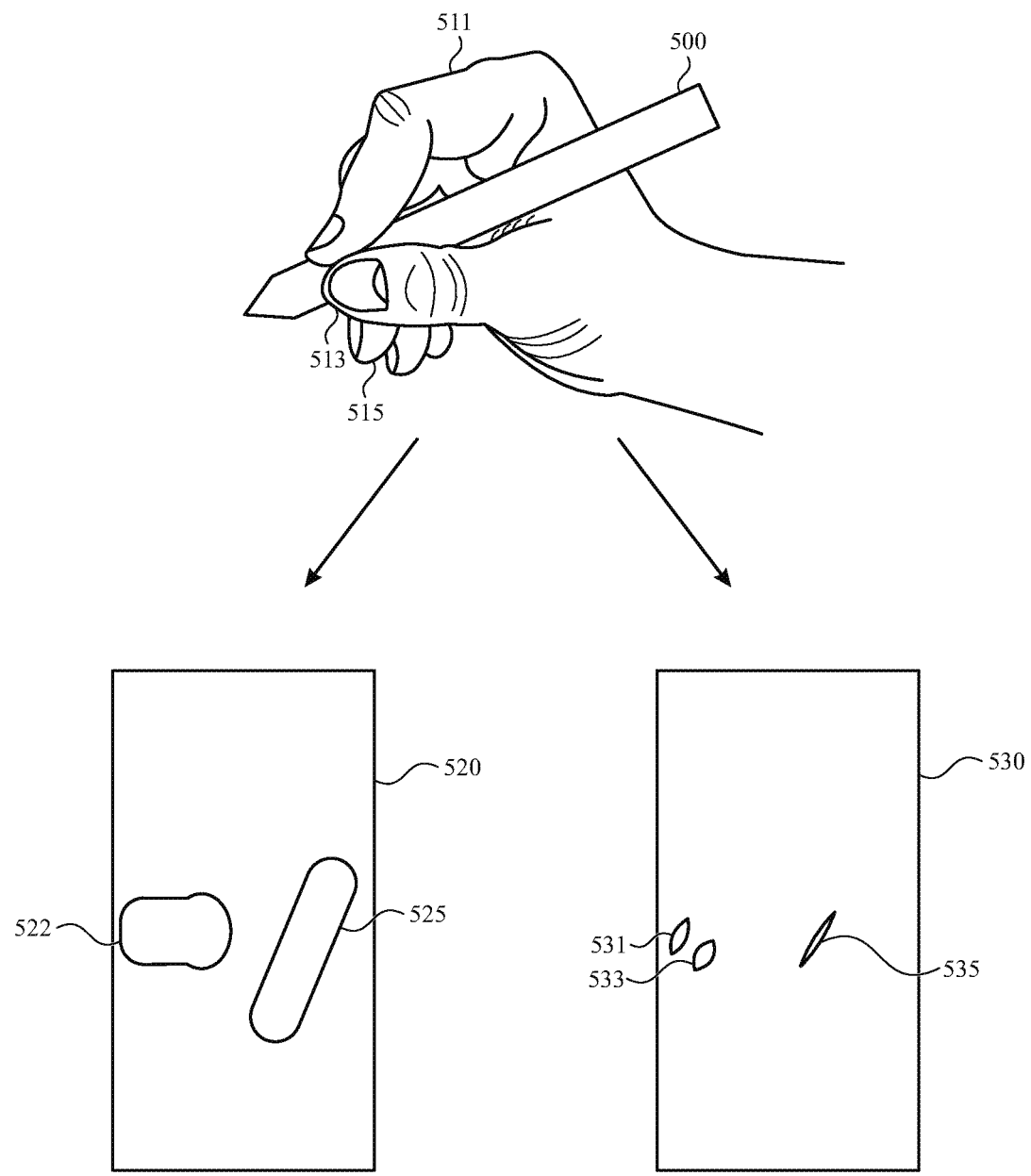
FIG. 5 illustrates an exemplary stylus and touch images according to some examples of the disclosure.

FIG. 5 illustrates an exemplary stylus 500 and touch images 520 and 530 according to some examples of the disclosure. In some examples, stylus 500 can sense one or more objects, such as fingers 511, 513, and 515 at its surface. If stylus 500 includes capacitive touch sensors, similar to stylus 400 described with respect to FIG. 4, the measurements of the capacitive touch sensors can produce touch image 520, for example. As an example, touch image 520 can include contacts 522 and 525, which can correspond to locations on the surface of stylus 500 where fingers 511, 513, and 515 are touching or proximate. Contact 522 can correspond to fingers 511 and 513 and contact 525 can correspond to finger 515, for example. That is to say, although fingers 511 and 513 can contact stylus 500 in two different places, they may be detected together as a single contact, contact 522, in touch image 520 due to the proximity of the fingers 511 and 513 and due to the fact that portions of fingers 511 and 513 proximate to, but not in contact with, the stylus surface can be detected by the capacitive touch sensors.

In some examples, stylus 500 can include one or more ultrasonic transducers, as will be described in more detail below. Unlike capacitive touch sensors, ultrasonic touch sensors can detect objects in contact with the surface of stylus 500, but may not detect objects proximate to, but not in contact with, the surface of stylus 500. Stylus 500, when implemented with ultrasonic touch sensors, can produce touch image 530. For example, touch image 530 can include contact 531 corresponding to finger 511, contact 533 corresponding to finger 513, and contact 535 corresponding to finger 515. Contacts 531, 533, and 535 can correspond only to locations on stylus 500 where fingers 511, 513, and 513 are touching the surface of stylus 500. In some examples, one or more algorithms operated by a processor within the stylus or on the host device can detect and/or reject multiple touches as needed. For example, additional contacts that are not consistent with an expected touch image for a user holding the stylus can be identified and/or rejected by such an algorithm. Thus, touch image 530 can more accurately detect and discriminate touches on the surface of stylus 500 than touch image 520, for example. Ultrasonic touch sensors can also have the advantage of detecting touch even when one or more touching objects are poorly grounded and/or poorly capacitive coupled to the stylus body. For example, ultrasonic touch sensors can detect touch even when the user does not make direct with the stylus (e.g., the user is wearing gloves) or is poorly grounded due to contact with water (e.g., operation with wet or sweaty fingers or in a wet or underwater environment). A similar degree of performance may not be possible using capacitive touch sensors, and even if it is possible, it may require a large number of touch nodes to accurately detect and discriminate touches in close proximity to one another.

Figure 6A:
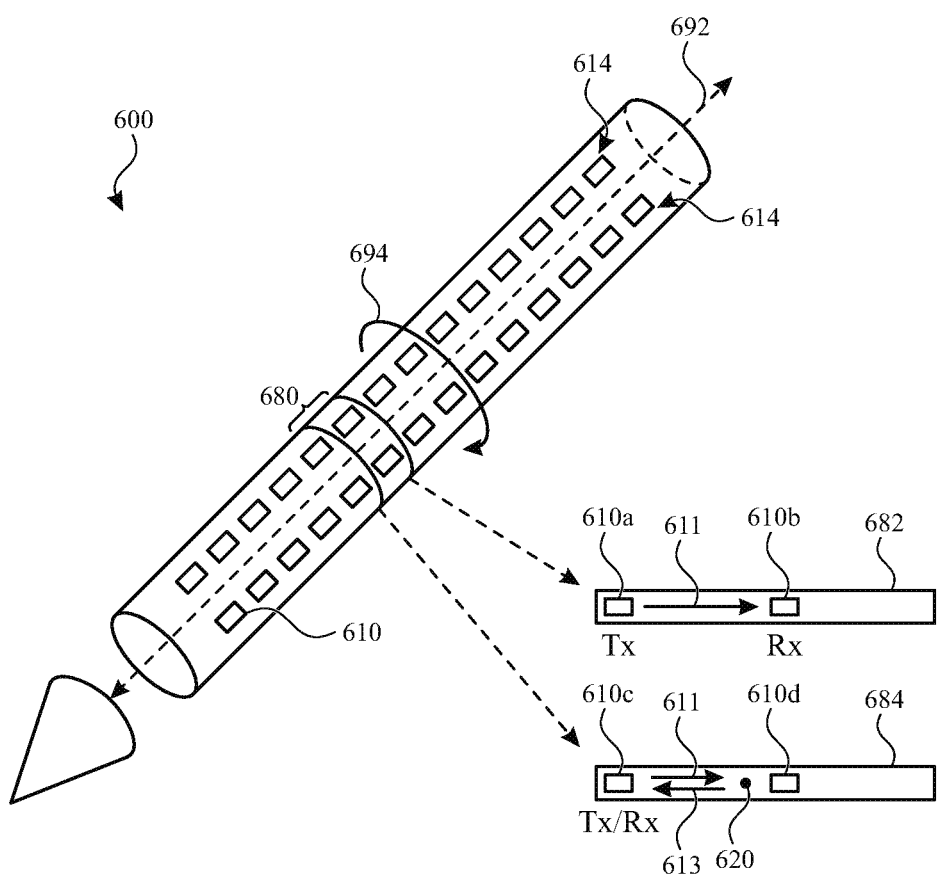
FIG. 6A illustrates a stylus outfitted with a plurality of ultrasonic transducers according to examples of the disclosure.

FIG. 6A illustrates a stylus 600 outfitted with a plurality of ultrasonic transducers 610 according to examples of the disclosure. Each ultrasonic transducer 610 can be configured to transmit and receive ultrasonic waves, for example. In some examples, stylus 600 can include multiple ultrasonic transducers in the locations indicated by ultrasonic transducers 610 in a configuration described with reference to FIG. 12. In some examples, the stylus 600 can include one ultrasonic transducer at each location of ultrasonic transducers 600. In some examples, ultrasonic transducers 610 can be arranged in a plurality of rows 614 along the length 692 of stylus 600. Although ultrasonic transducers 610 are arranged in rows 614 that may not completely overlap the surface of stylus 600, the ultrasonic transducers can still sense a touch at any location around the circumference 694 of the stylus 600 along the length of rows 614, for example.

For ease of description, an area 680 of the stylus 600 shaft can be "unrolled" as shown in a first unrolled area 682 and second unrolled area 684, for example. In some examples, as shown in the first unrolled area 682, the ultrasonic transducers 610 can operate in a "pitch-catch" configuration. For example, a first ultrasonic transducer 610a can transmit an ultrasonic wave 611 to be received by a second ultrasonic transducer 610b. The presence of an object touching the stylus 600 along the path of the ultrasonic wave 611 can be determined based on the magnitude of the wave 611 when it is received by the second ultrasonic transducer 610b, for example. In some examples, the full width of unrolled area 682 can be sensed by operating the second ultrasonic transducer 610b as a transmitter to transmit a wave to the right to be received by the first ultrasonic transducer 610a or by operating the first ultrasonic transducer 610a to transmit an ultrasonic wave to the left.

In some examples, as shown in the second unrolled area 684, the ultrasonic transducers 610 can determine the location around the circumference 694 of the stylus 600 of an object touching the stylus 600 by detecting a reflected wave (e.g., in a "pulse-echo" mode) 613 from the location 620 of touch. For example, a first ultrasonic transducer 610c can transmit an ultrasonic wave 611 and receive reflected wave 613 reflected from an object in contact with the stylus 600 at touch location 620. Based on the time of arrival of the reflected wave 613, the location 620 of the object along the circumference 694 can be determined. In some examples, a second ultrasonic transducer 610d can also be used to detect touch on the remaining part of unrolled area 684 by transmitting an ultrasonic wave to the right. In some examples, both the first ultrasonic transducer 610c and the second ultrasonic transducer 610d can transmit a wave either to the left or to the right.

Whether the ultrasonic transducers 610 are operated as described with respect to the first unrolled area 682 (e.g., in a "pitch-catch" mode) or operated as described with respect to the second unrolled area 684 (e.g., to determine time of arrival in a "pulse-echo" mode), the location along the stylus length 692 of an object touching the stylus 600 can be determined based on which ultrasonic transducers 610 detect the object. In some examples, in either configuration, it can be advantageous to include multiple ultrasonic transducers at each location along the length 692 of the stylus so that a touch anywhere around the stylus 600 circumference 694 can be detected, including a touch directly on top of an ultrasonic transducer 610. In some examples, an ultrasonic transducer 610 may be unable to detect on object directly on top of it, so providing an additional ultrasonic transducer at the same location along the stylus 600 length 692 can eliminate these "blind spots".

In some examples, providing ultrasonic transducers 610 in rows 614 as shown can reduce the complexity of circuitry necessary to detect a touch compared to a stylus outfitted with sensors overlapping the entirety of its touch sensitive surface (e.g., stylus 400 which includes capacitive touch sensors). Reducing the number of touch sensors in this way can reduce the number of components in stylus 600 and reduce the number of sense channels needed for a touch controller (not shown) included in the stylus 600, for example. Although FIG. 6A illustrates the ultrasonic transducers 610 as being arranged in rows 614, in some examples, other arrangements are possible. For example, one or more ultrasonic transducers 610 can be staggered with respect to one another. In some examples, the number of ultrasonic transducers at each location along the length 692 of the stylus 600 can be varied to be more dense in some parts of the stylus 600 shaft (e.g., in a location where the user is more likely to grasp, such as towards the tip or in the middle of the stylus shaft) than in other parts of the stylus shaft.

Figure 6B:
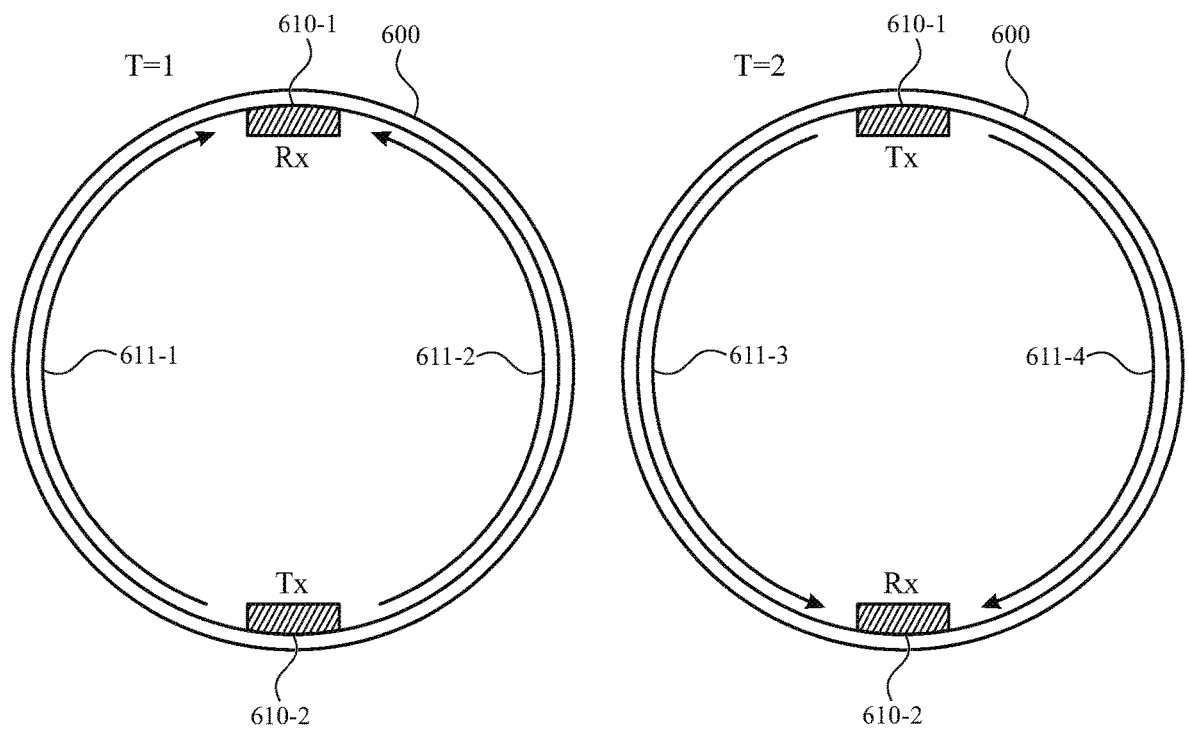
FIG. 6B illustrates an exemplary cross-section of a stylus outfitted with a plurality of ultrasonic transducers according to examples of the disclosure.

FIG. 6B illustrates an exemplary cross-section of a stylus 600 outfitted with a plurality of ultrasonic transducers 610 according to examples of the disclosure. In some examples, the stylus 600 can include multiple ultrasonic transducers in an array at each location indicated as an ultrasonic transducer 610. As an example, the ultrasonic transducers 610 can be arranged as described with reference to FIG. 12. In some examples, stylus 600 can include two rows 614 of ultrasonic transducers 610, shown here in a cross-sectional view. Ultrasonic transducers 610 can act as transmitters Tx to transmit one or more ultrasonic waves and receivers Rx to receive one or more ultrasonic waves, for example.

During a first period of time T=1, a top ultrasonic transducer 610-1 can act as a receiver Rx to receive one or more ultrasonic waves 611 from a bottom ultrasonic transducer 610-2. In some examples, the bottom ultrasonic transducer 610-2 can transmit a clockwise ultrasonic wave 611-1 during a first time within T=1 and can transmit a counterclockwise ultrasonic wave 611-2 during a second time within T=1. Likewise, during a second period of time T=2, the top ultrasonic transducer 610-1 can act as a transmitter Tx to transmit one or more ultrasonic waves 611 to the bottom ultrasonic transducer 610-2. In some examples, the top ultrasonic transducer 610-1 can transmit a counterclockwise ultrasonic wave 611-3 during a first time within T=2 and can transmit a clockwise ultrasonic wave 611-4 during a second time within T=2. In some examples, the function of the top ultrasonic transducer 610-1 and the bottom ultrasonic transducer 610-2 can be fixed—that is, one ultrasonic transducer 610 can always transmit a signal for the other one to receive. In some examples, the top ultrasonic transducer 610-1 and the bottom ultrasonic transducer 610-2 can alternate between operating as a transmitter and operating as a receiver. It can be advantageous for the ultrasonic transducers 610 to alternate between transmitting and receiving the ultrasonic wave because an ultrasonic transducer acting as a receiver may not be able to detect a touch directly on top of it. By alternating the functionality of the ultrasonic transducers 610, every touch can be detected because a touch directly on top of one transducer can be detected by the other transducer.

As will be described below with reference to FIG. 7, a touch can be detected based on the magnitude of the received ultrasonic waves 611 at ultrasonic transducer 610-1. The generation of directional ultrasonic waves 611-1, 611-2, 611-3, and 611-4 will be described later with reference to FIGS. 11-12. Although FIGS. 6A-6B illustrate a stylus 600 with two rows 614 of ultrasonic transducers 610, one row of transducers is possible where the one row of transducers alternates between acting as a transmitter and acting as a receiver. However, it can be advantageous to include at least two rows 614 of ultrasonic transducers because it can allow the stylus 600 to detect a touch directly on top of an ultrasonic transducer 610. Further, providing additional ultrasonic transducers 610 can increase the resolution of detectable touch locations, as transducers 610 operating in the "pitch-catch" configuration may only be able to detect the presence of an object but not its location around the circumference 694 of the stylus 600 beyond determining which side of each transducer 610 the object is adjacent to. In this way, adding rows 614 of transducers 610 can improve the sensitivity of stylus 600, for example. In some examples, stylus 600 can include more than two rows 614 of ultrasonic transducers 610.

Figure 6C:
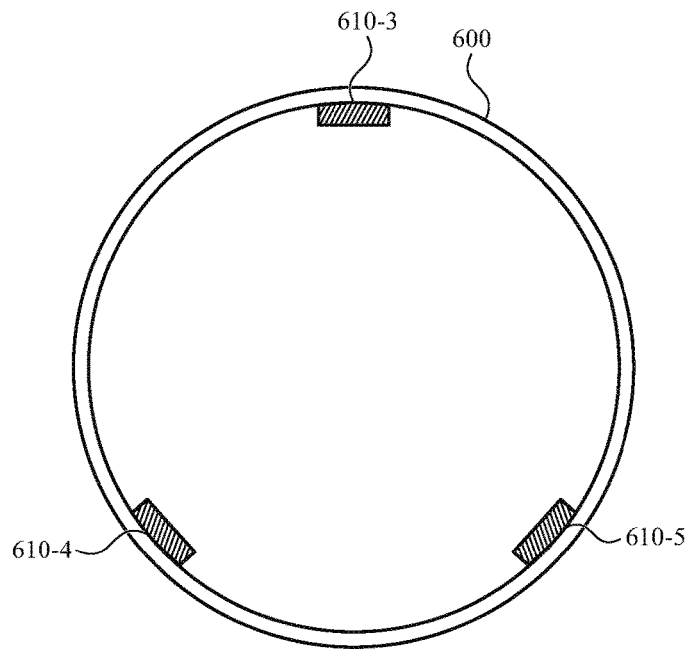
FIG. 6C illustrates an exemplary cross-section of a stylus outfitted with a plurality of ultrasonic transducers according to examples of the disclosure.

FIG. 6C illustrates an exemplary cross-section of a stylus 600 outfitted with a plurality of ultrasonic transducers 610 according to examples of the disclosure. In some examples, stylus 600 can include three rows 614 of ultrasonic transducers 610, including ultrasonic transducers 610-3, 610-4, and 610-5. The rows 614 can be evenly spaced or unevenly spaced, for example. Additional rows 614 are possible and can increase the touch sensitivity of stylus 600, but can also add components and complexity to stylus 600, creating a tradeoff between sensitivity and simplicity.

In some examples, one ultrasonic transducer 610 can act as a transmitter while the others act as receivers. For example, a first ultrasonic transducer 610-3 can transmit an ultrasonic wave in both directions to be detected by a second ultrasonic transducer 610-4 and a third ultrasonic transducer 610-5. Similarly, the second ultrasonic transducer 610-4 and the third ultrasonic transducer 610-5 can act as transmitters while the remaining transducers 610 act as receivers. In another example, all three ultrasonic transducers 610 can produce a directional wave in a same direction simultaneously and switch to acting as a receiver to receive the directional waves. The transducers 610 can alternate which direction the wave travels, for example. Other methods of using three or more rows 614 of ultrasonic transducers 610 are possible.

Figure 7:
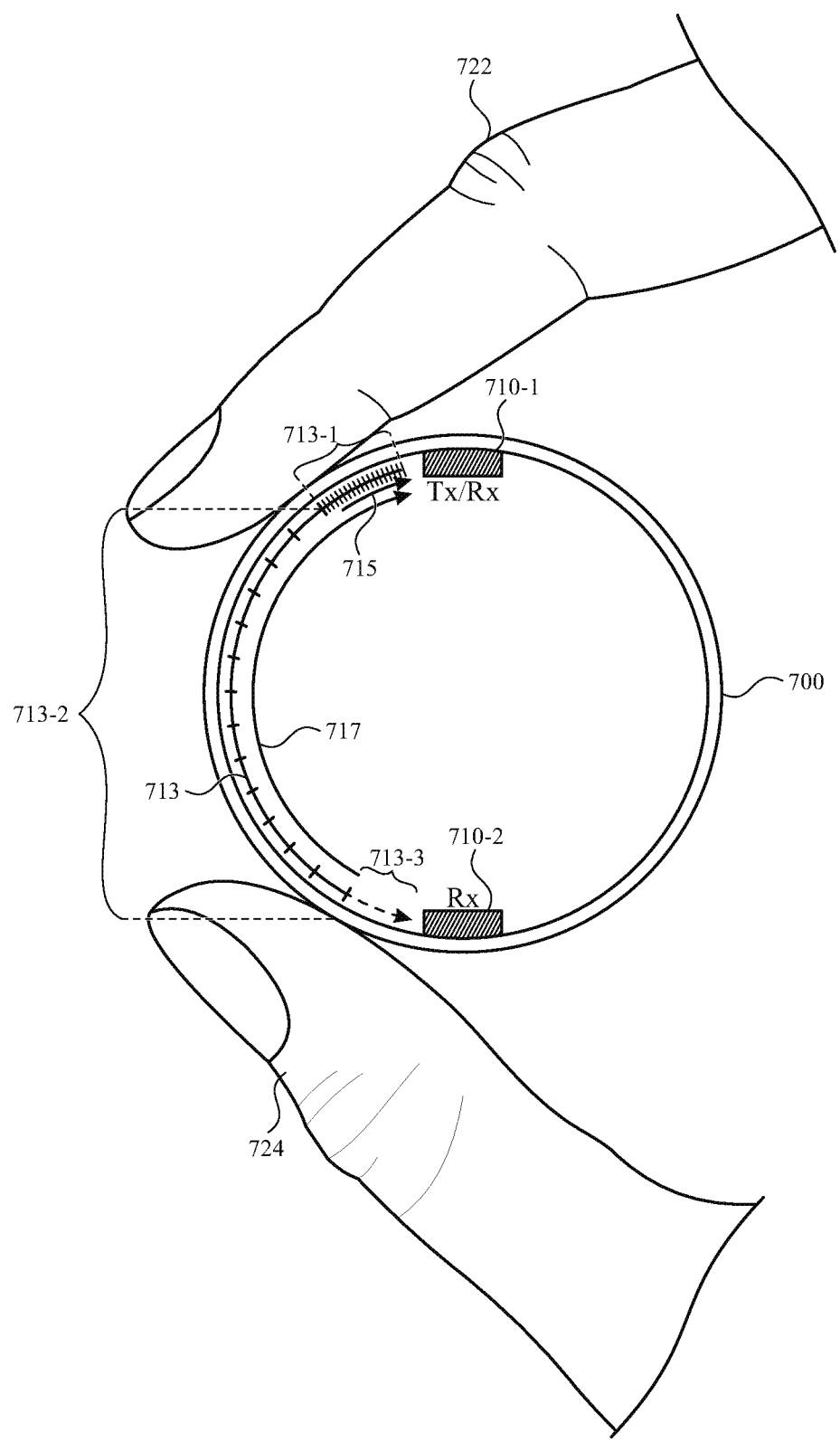
FIG. 7 illustrates an exemplary cross-section of a stylus outfitted with a plurality of ultrasonic transducers detecting touch according to examples of the disclosure.

FIG. 7 illustrates an exemplary cross-section of a stylus 700 outfitted with a plurality of ultrasonic transducers 710 detecting touch according to examples of the disclosure. In some examples, ultrasonic transducers 710 can be arranged in rows, just as ultrasonic transducers 610 can be arranged in rows 614 along stylus 600 described with reference to FIGS. 6A-6C. As an example, finger 722 and thumb 724 can touch stylus 700. Top ultrasonic transducer 710-1 can transmit ultrasonic wave 713, for example. In some examples, finger 722 and thumb 724 can be detected in two ways.

First, the magnitude of ultrasonic wave 713 can become attenuated in locations where finger 722 and thumb 724 are touching stylus 700, allowing the stylus 700 to detect touch using a "pitch-catch" configuration, as described above with reference to FIGS. 6A-6C. For example, when transmitted, ultrasonic wave 713 can have a first magnitude, shown in wave segment 713-1. At the location of finger 722, the magnitude of ultrasonic wave 713 can attenuate to a reduced magnitude shown in wave segment 713-2, for example. Likewise, for example, at the location of thumb 724, the magnitude of ultrasonic wave 713 can attenuate to a further reduced magnitude shown in wave segment 713-3. Bottom ultrasonic transducer 710-2 can receive ultrasonic wave 713 and measure its magnitude to determine the presence of an object along the path of ultrasonic wave 713. However, in some examples, this "pitch-catch" configuration may be unable to resolve the number of objects touching stylus 700 and/or the location(s) of the object(s) around the circumference of the stylus beyond which side of the ultrasonic transducers 710 the object(s) is/are proximate to.

Second, ultrasonic wave 713 can be reflected at locations where finger 722 and thumb 724 are touching stylus 700, allowing the stylus 700 to detect touch based on time of arrival of the reflected wave (e.g., in a "pulse-echo" mode), as described above with reference to FIGS. 6A-C. For example, finger 722 can cause reflected wave 715 to travel towards top ultrasonic transducer 710-1 and thumb 724 can cause reflected wave 717 to travel towards top ultrasonic transducer 710-1. After transmitting ultrasonic wave 713, the top ultrasonic transducer 710-1 can change operation modes to operate as a receiving ultrasonic transducer to receive reflected waves 715 and 717. The locations of finger 722 and thumb 724 can be resolved based on the times at which the reflected waves 715 and 717 are received. As shown in FIG. 7, ultrasonic wave 713 can encounter finger 722 before it encounters thumb 724, for example. Additionally, wave 713 can travel a shorter distance from finger 722 to the top ultrasonic transducer 710-1 than wave 715 can travel from thumb 724 to the top ultrasonic transducer 710-1. Therefore, wave 713 can have a shorter "time of flight" than wave 715 has, allowing the locations of both finger 722 and thumb 724 to be resolved. When no objects are touching stylus 700, the ultrasonic wave 713 can be received by the first ultrasonic transducer 710-1 and/or the second ultrasonic transducer 710-2. The received ultrasonic wave can be unattenuated when no objects are touching the stylus 700.

However, in some examples, finger 722 and/or thumb 724 may not couple to stylus 700 to cause a detectable attenuation or reflection of transmitted ultrasonic wave 713. Poor coupling can be caused by the material of the surface of stylus 700 (e.g., the material of the stylus 700 is a poor conductor of ultrasonic waves), a characteristic of an object touching stylus 700 (e.g., a user is wearing gloves), one or more defects formed on the surface of stylus 700 over time, or environmental factors (e.g., air pressure and humidity). Accordingly, it can be advantageous in some examples to provide a modified stylus with improved coupling and sensitivity.

Figure 8:
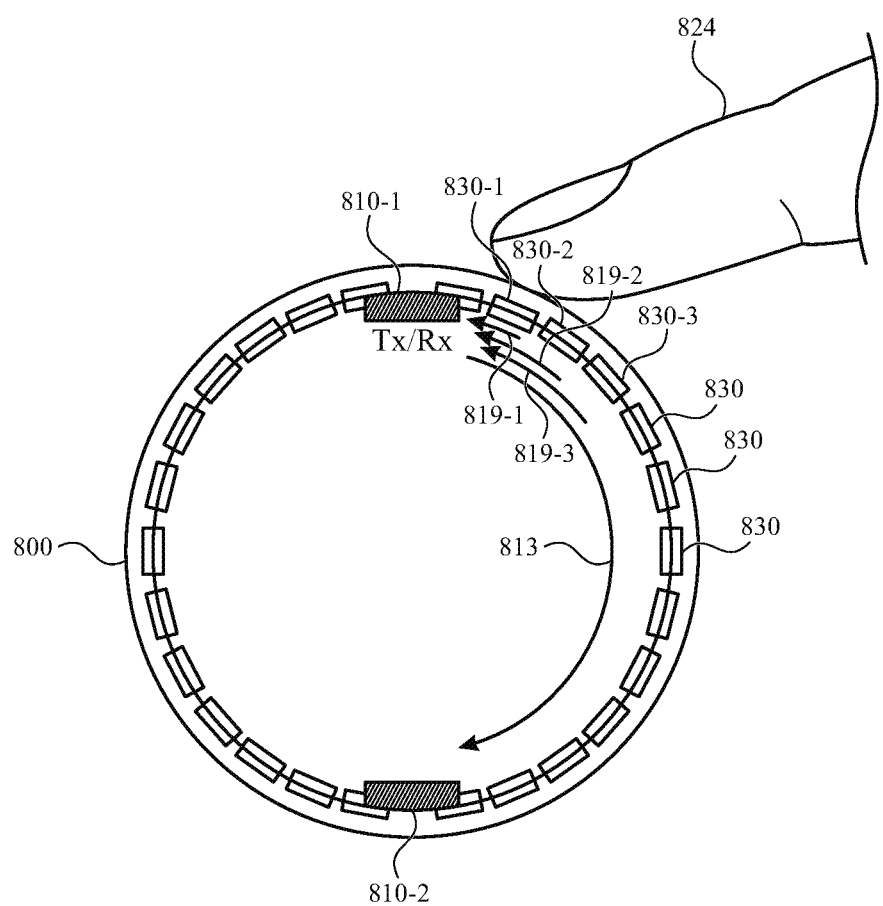
FIG. 8 illustrates an exemplary cross-section of a touch sensitive stylus including ultrasonic transducers and barriers according to examples of the disclosure.

FIG. 8 illustrates an exemplary cross-section of a touch sensitive stylus 800 including ultrasonic transducers 810 and barriers 830 according to examples of the disclosure. In some examples, ultrasonic transducers 810 can be arranged in rows, just as ultrasonic transducers 610 can be arranged in rows 614 along the length of stylus 600 described with reference to FIGS. 6A-6C. Stylus 800 can include ultrasonic transducers 810 and barriers 830, for example. In some examples, barriers 830 can be inside and/or outside of the shaft of stylus 800. Further, the barriers can be etched into the stylus shaft material or formed of material deposited onto the stylus shaft, for example. As an example, finger 824 can be in contact with the stylus 800. Top ultrasonic transducer 810-1 can act as a transmitter and transmit ultrasonic wave 813 and act as a receiver to receive reflected waves 819, for example. Additionally, bottom ultrasonic transducer 810-2 can also act as a transmitter and receiver simultaneously or sequentially with top ultrasonic transducer 810-1. In some examples, the transmitted ultrasonic wave 813 can reflect off of barriers 830, generating reflected ultrasonic waves 819.

In some examples, the reflected ultrasonic waves 819 can be received by top ultrasonic transducer 810-1. Based on the magnitudes of the received reflected ultrasonic waves 819, a location of an object touching stylus 800 can be determined, for example. In some examples, the expected arrival time of each reflected ultrasonic wave 819 can be determined and stored by a touch controller of the stylus 800. Further, during a calibration procedure, for example, the expected magnitude of each reflected ultrasonic wave 819 can be determined when there are no objects touching the stylus 800. As an example, finger 824 can touch stylus 800 at a location corresponding to barrier 830-1. Accordingly, reflected wave 819-1 can have an attenuated magnitude compared to the magnitude of a wave reflected from barrier 830-1 during the calibration procedure (i.e., when no object is touching the stylus 800 at barrier 830-1), for example. Further, reflected wave 819-2 (reflected from barrier 830-2) and reflected wave 819-3 (reflected from barrier 830-3) can have less attenuation than reflected wave 819-1 when there are no objects touching stylus 800 at barriers 830-2 and 830-3. In some examples, when an object is touching the stylus 800, all reflected waves 830 can be somewhat attenuated, even reflected waves 830 from barriers 819 that do not correspond to the location of the touching object. Therefore, in some examples, the touch controller can establish a non-zero attenuation threshold indicative of a location of touch. In some examples, stylus 800 can include multiple rows of ultrasonic transducers 810 so as to detect touch directly on top of the transducers 810, as described above. Further, it can be advantageous to include multiple transducers 810 at each location along the length of the stylus 800 to increase sensitivity. When the ultrasonic wave 813 reflects off of a barrier 830, its magnitude can be attenuated, thereby reducing the magnitude of the wave more and more as the wave travels further from the ultrasonic transducer 810. In some examples, the ultrasonic transducers 810 can alternate which direction the ultrasonic wave 813 is sent in to increase resolution, but this can make the touch detection process slower. Therefore, providing additional ultrasonic transducers 810 can improve sensitivity and speed at the same time.

Although styluses (e.g., stylus 600, stylus 700, and stylus 800) can sense a touch using ultrasonic transducers (e.g., ultrasonic transducers 610, ultrasonic transducers 710, and ultrasonic transducers 810, respectively), in some examples, further reducing the number of touch sensors in the stylus can be desirable to reduce cost, complexity, and power consumption of the stylus. Accordingly, in some examples, an alternate arrangement of an ultrasonic transducer or ultrasonic transducers can be used.

Figure 9:
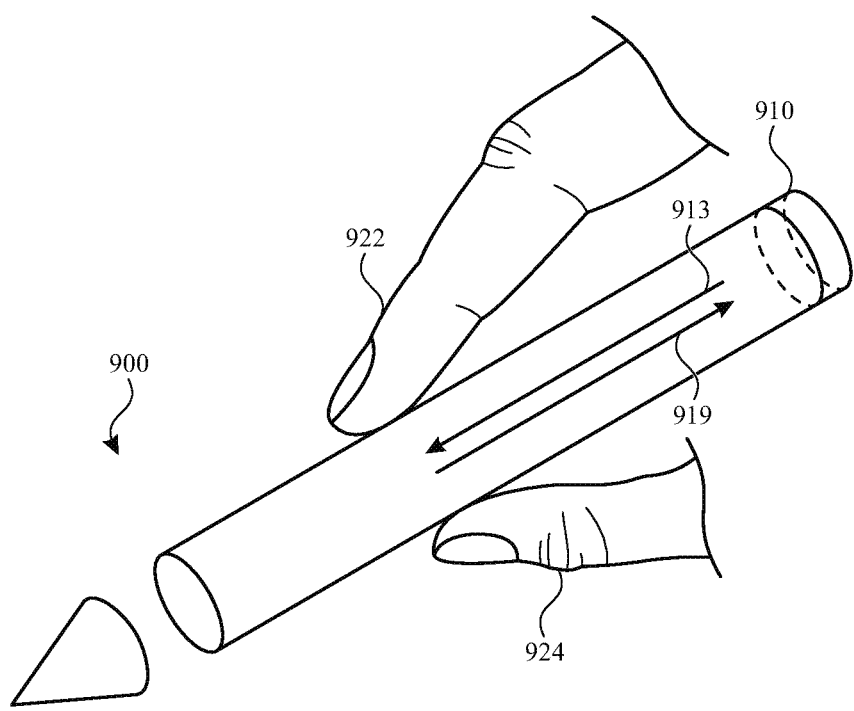
FIG. 9 illustrates an exemplary stylus including an ultrasonic transducer at its end according to examples of the disclosure.

FIG. 9 illustrates an exemplary stylus 900 including an ultrasonic transducer 910 at its end according to examples of the disclosure. As an example, stylus 900 is illustrated as being held by finger 922 and thumb 924. In some examples, ultrasonic transducer 910 can be used to determine the location(s) along the length of the stylus 900 of one or more objects, such as finger 922 and thumb 924. Ultrasonic transducer 910 can transmit ultrasonic wave 913 and receive reflected ultrasonic wave 919, for example. In some examples, a touch controller of the stylus can determine the location of finger 922 and thumb 924 along the length of the stylus 900 based on the time reflected ultrasonic wave 919 is received. Further, touch controller can determine the locations of multiple objects along the length of the stylus 900 if it receives multiple reflected waves in response to one transmitted wave 913, for example.

When stylus 900 includes only one ultrasonic transducer 910 disposed completely around the circumference of the stylus 900, object location around the circumference of the stylus may not be possible to determine. However, in some examples, detecting only the object location along the length of the stylus 900 can be sufficient. For example, stylus 900 would be able to detect a sliding gesture where the user slides a finger or other object along the length of the stylus. Further, reducing the number of ultrasonic transducers 910 down to one can greatly simplify the circuitry of the stylus 900 including the number of transducers themselves and the number of signals received by a touch controller of the stylus.

In some examples, stylus 900 can further include internal channels along the length of the stylus to guide the ultrasonic wave 913. The internal channels can be positioned at a plurality of radial positions around the circumference of the stylus 900, for example. In some examples, inclusion of these internal channels can allow stylus 900 to determine the position of an object around the circumference of the stylus by directing ultrasonic waves 913 towards each channel one at a time and receiving reflected waves 919 through channels corresponding to the radial location of the touching object.

Figure 10A:
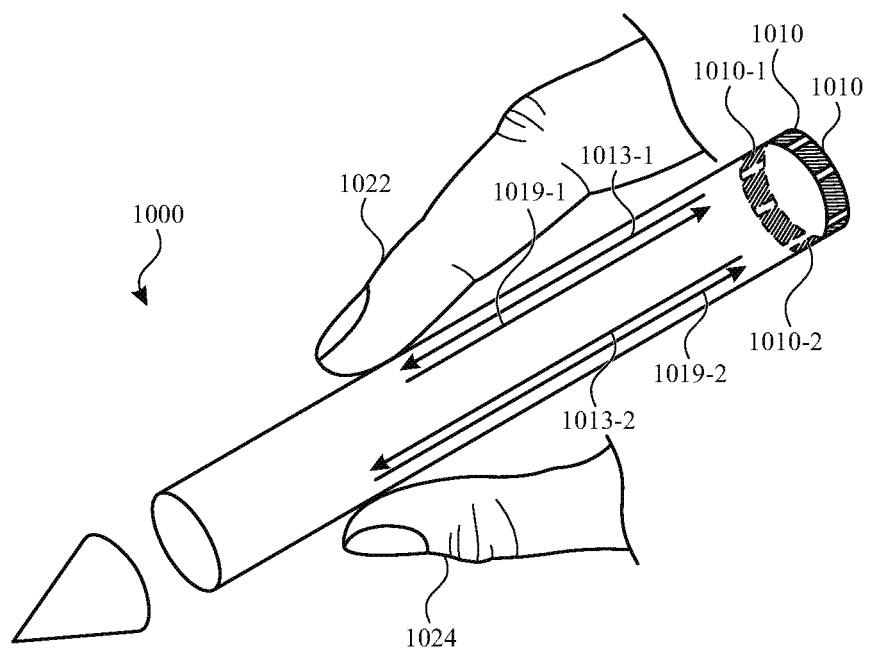
FIG. 10A illustrates an exemplary stylus including ultrasonic transducers disposed in a ring formation at an end of the stylus configured to perform a "passive search" according to examples of the disclosure.

FIG. 10A illustrates an exemplary stylus 1000 including ultrasonic transducers 1010 disposed in a ring formation at an end of the stylus 1000 configured to perform a "passive search" according to examples of the disclosure. The ultrasonic transducers 1010 can transmit ultrasonic waves 1013 and receive reflected ultrasonic waves 1019 to determine the location of one or more objects along the length of stylus 1000. In some examples, the ultrasonic transducers 1010 can transmit ultrasonic waves 1013 one at a time. The location of one or more touch objects along the circumference of the stylus 1000 can be determined from a "passive search" in some examples. That is, the location of the one or more objects along the circumference of the stylus 1000 can be determined based on which ultrasonic transducer 1010 receives the reflected wave.

As an example, stylus 1000 can be held by finger 1022 and thumb 1024. Finger 1022 can contact stylus 1000 along its circumference at a location corresponding to a first ultrasonic transducer 1010-1, while thumb 1024 can contact stylus along its circumference at a location corresponding to a second ultrasonic transducer 1010-2, for example. The first ultrasonic transducer 1010-1 can emit a first ultrasonic wave 1013-1 and receive a first reflected ultrasonic wave 1019-1. Based on the time that the first reflected ultrasonic wave 1019-1 is received, a touch controller of the stylus can also determine the location of finger 1022 along the length of the stylus. Likewise, the second ultrasonic transducer 1010-2 can emit a second ultrasonic wave 1013-2 and receive a second reflected ultrasonic wave 1019-2. Based on the time that the second reflected ultrasonic wave 1019-2 is received, a touch controller of the stylus can also determine the location of thumb 1024 along the length of the stylus. In some examples, the first ultrasonic transducer 1010-1 can emit the first ultrasonic wave 1013-1 at a first time and the second ultrasonic transducer 1010-2 can emit the second ultrasonic wave 1013-2 at a second time, and so on. In some examples, multiple ultrasonic transducers 1010 can emit ultrasonic waves concurrently. Further, in some examples where multiple ultrasonic transducers 1010 emit ultrasonic waves concurrently, the ultrasonic waves can be distinguished using frequency or phase differences. In some examples, the "passive search" can determine an object's location along the length of the stylus and around the circumference of the stylus in one step—that is, operating the transducers 1010 as described above either in series or simultaneously.

Figure 10B:
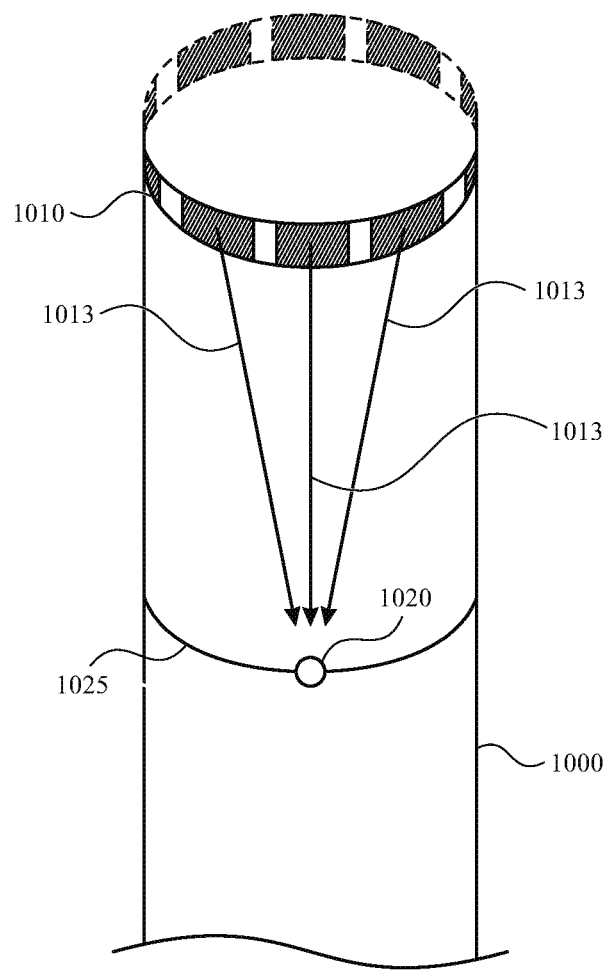
FIG. 10B illustrates an exemplary stylus including ultrasonic transducers disposed in a ring formation at an end of the stylus configured to perform an "active search" according to examples of the disclosure.

FIG. 10B illustrates an exemplary stylus 1000 including ultrasonic transducers 1010 disposed in a ring formation at an end of the stylus 1000 configured to perform an "active search" according to examples of the disclosure. As described above with reference to FIG. 10A, in a first step, each ultrasonic transducer 1000 can launch an ultrasonic wave 1013 along the length of stylus 1000. Based on the time at which a reflected wave is received, the location of touch along the length of stylus 1000 can be determined. In some examples, in a second step, to resolve the location of a touch 1020 along the circumference of the stylus 1000, the ultrasonic transducers 1010 can perform an "active search". That is, the ultrasonic transducers 1010 can target the ultrasonic waves 1013 at a series of locations around the circumference of the stylus 1000 at a given distance along the length of the stylus 1000 (e.g., along circumferential line 1025). In some examples, multiple ultrasonic transducers 1010 can be used to generate directed waves using constructive and/or destructive interference. The ultrasonic transducers 1010 can search along the circumferential line 1025 until the touch location 1020 is determined based on a reflection of the ultrasonic waves 1013 from an object in contact with the stylus 1000 at location 1025, for example.

As discussed above with reference to FIGS. 6-10, in some examples, a stylus can include one or more ultrasonic transducers configured to produce ultrasonic waves that travel in one direction (e.g., as opposed to radiating from the ultrasonic transducers in all directions). Various ultrasonic transducer configurations and methods for producing directional ultrasonic waves will now be described.

Figure 11:
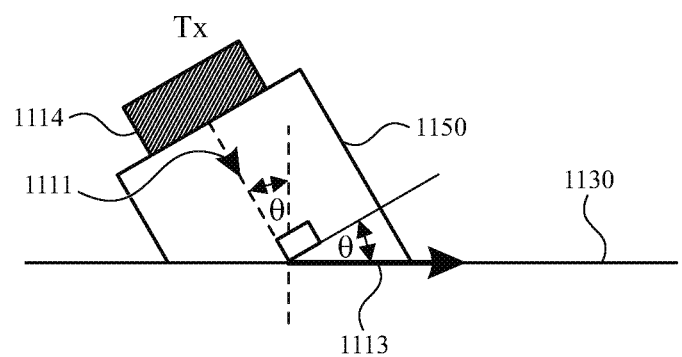
FIG. 11 illustrates an exemplary ultrasonic transducer configured to transmit a guided wave according to examples of the disclosure.

FIG. 11 illustrates an exemplary ultrasonic transducer 1114 configured to transmit a guided wave 1113 according to examples of the disclosure. In some examples, ultrasonic transducer 1114 can be situated on top of wedge 1150, which can be attached to the surface 1130 of a stylus at an angle θ. In some examples, surface 1130 can be an interior surface of the stylus shaft. In some examples, surface 1130 can be on an exterior surface of the stylus shaft. In some examples, surface 1130 can be embedded within the stylus shaft (e.g., by forming surface 1130, attaching the wedge 1150 and ultrasonic transducer 114, and then applying a material on top). The angle θ can correspond to an angle at which the wave 1111 changes paths due to a change in material properties between wedge 1150 and surface 1130. Ultrasonic transducer can transmit an ultrasonic wave 1111 into the wedge 1114, which will continue to travel along the surface 1130 as a directional ultrasonic wave 1113. In some examples, angle θ can be selected based on the material properties of wedge 1150 and surface 1130 and properties of the ultrasonic wave 1111, such as wavelength and frequency.

Figure 12:
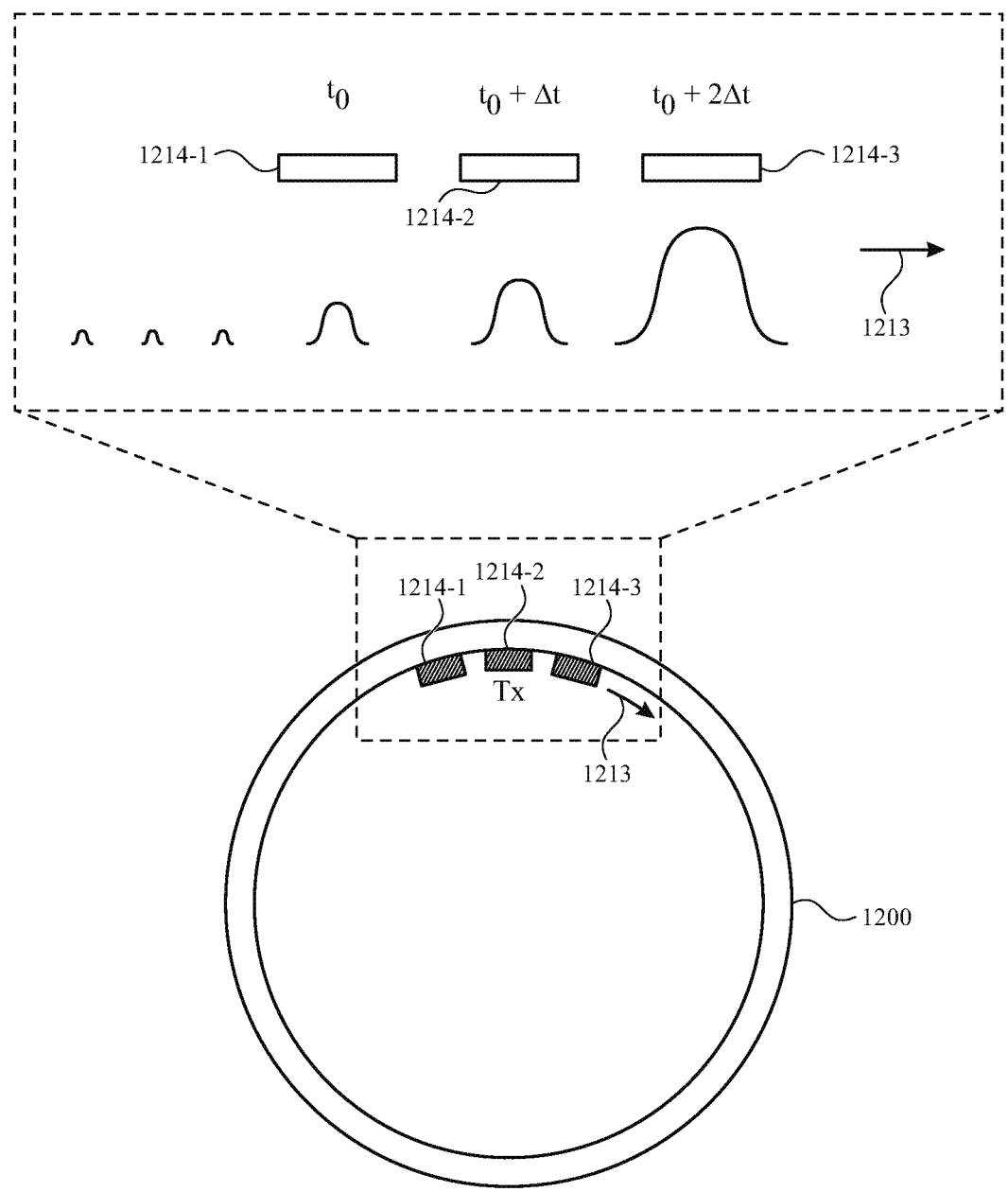
FIG. 12 illustrates an exemplary stylus outfitted with ultrasonic transducers configured to produce a directional ultrasonic wave.

FIG. 12 illustrates an exemplary stylus 1200 outfitted with ultrasonic transducers 1214 configured to produce a directional ultrasonic wave 1213. In some examples, the principles of constructive and destructive interference can be applied to create a directional ultrasonic wave 1213 using a plurality of ultrasonic transducers 1214 positioned within stylus 1200. For example, ultrasonic transducer 1214-1 can transmit a first ultrasonic wave at a first time $t_0$. After a predetermined time delay Δt, a second ultrasonic transducer 1214-2 can transmit a second ultrasonic wave, for example. After a delay of 2Δt, a third ultrasonic transducer 1214-3 can transmit a third ultrasonic wave. The resulting directional wave can therefore include coherent contributions from each of the first, second, and third ultrasonic waves, for example. In some examples, additional ultrasonic transducers can be used in this manner. The spacing of the ultrasonic transducers 1214 and the time delay Δt can be selected to create constructive interference in the desired direction of wave travel (e.g., clockwise, as shown in FIG. 12) and destructive interference in the other direction, for example. The constructive interference in the direction of wave travel causes the wave amplitude to increase in one direction (e.g., clockwise). Likewise, the destructive interference in the direction opposite of the desired direction of wave travel causes the wave amplitude to decrease in the other direction (e.g., counterclockwise). As a result, the amplitude in the direction of wave travel can be so large compared to the amplitude in the other direction that the wave effectively travels in one direction. In one or more examples described with reference to FIGS. 1-11, a stylus can include ultrasonic transducers arranged as shown in FIG. 12 in place of any single ultrasonic transducers described, thereby allowing the one or more ultrasonic transducers to produce a directional wave.

Although several examples of the disclosure have been discussed as they relate to a stylus, in some examples, one or more examples described above can be incorporated into other kinds of input devices.

Therefore, according to the above, some examples of the disclosure are directed to a stylus comprising: a shaft; a tip coupled to an end of the shaft; one or more ultrasonic transducers coupled to the shaft, the one or more ultrasonic transducers configured to transmit one or more transmitted ultrasonic waves and to sense one or more sensed ultrasonic waves; and a touch controller operatively coupled to the one or more ultrasonic transducers, the touch controller configured to generate the one or more transmitted ultrasonic waves and determine a position in at least one dimension of an object touching an exterior surface of the shaft based on one or more characteristics of the one or more sensed ultrasonic waves. Additionally or alternatively, in some examples, the shaft extends along an axis, and the one or more ultrasonic transducers comprises a plurality of ultrasonic transducers arranged in one or more rows, the one or more rows parallel to the first axis. Additionally or alternatively, in some examples, the shaft includes a plurality of cross-sectional areas orthogonal to the axis, the one or more rows comprise a first row and a second row, one or more of the plurality of cross-sectional areas each comprise a first ultrasonic transducer included in the first row and a second ultrasonic transducer included in the second row, the first ultrasonic transducer is configured to transmit the one or more transmitted ultrasonic waves, and the second ultrasonic transducer is configured to sense the one or more sensed ultrasonic waves. Additionally or alternatively, in some examples, the shaft extends along an axis, the stylus shaft includes a plurality of cross-sectional areas orthogonal to the axis, the one or more ultrasonic transducers comprises a plurality of ultrasonic transducers arranged around the circumference of one of the plurality of cross-sectional areas. Additionally or alternatively, in some examples, the shaft extends along an axis, the shaft includes a plurality of cross-sectional areas orthogonal to the axis, an ultrasonic transducer of the one or more ultrasonic transducers is disposed at a distal end opposite the tip around the circumference of one of the plurality of cross-sectional areas, the ultrasonic transducer is configured to: at a first time, generate one of the one or more transmitted ultrasonic waves, the transmitted ultrasonic wave propagating along the axis; and at a second time after the first time, sense one of the one or more sensed ultrasonic waves, and the touch controller determines the position of the object based on the second time. Additionally or alternatively, in some examples, the one or more characteristics of the reflected wave comprise one or more of time of arrival and magnitude. Additionally or alternatively, in some examples, the stylus further comprises a plurality of ultrasonic barriers configured to reflect the ultrasonic wave. Additionally or alternatively, in some examples, the ultrasonic barriers are coupled to the shaft or etched or embedded in the shaft. Additionally or alternatively, in some examples, the one or more ultrasonic transducers comprise a plurality of ultrasonic transducers configured to: at a first time, transmit a first of the one or more transmitted ultrasonic waves using a first ultrasonic transducer; and after a delay of a predetermined duration after the first time, transmit a second of the one or more transmitted ultrasonic waves using a second ultrasonic transducer disposed proximate to the first ultrasonic transducer, wherein the first transmitted ultrasonic wave and the second transmitted ultrasonic wave produce a directional ultrasonic wave including coherent contributions from the first transmitted ultrasonic wave and the second transmitted ultrasonic wave. Additionally or alternatively, in some examples, the stylus further comprises a wedge coupled to the interior surface of the shaft, wherein at least one of the one or more ultrasonic transducers are mounted to the wedge, and the one or more transmitted ultrasonic waves generated by the one or more ultrasonic transducers is coupled to the surface of the shaft via the wedge.

Some examples of the disclosure are related to a method for determining a location of an object touching an outside of a stylus comprising a tip and a shaft, the method comprising: transmitting, with one or more ultrasonic transducers coupled to the shaft, one or more transmitted ultrasonic waves; receiving, with the one or more ultrasonic transducers, one or more received ultrasonic waves; and determining, with a touch controller operatively coupled to the plurality of ultrasonic transducers, the position in at least one dimension of the object touching the outside of the stylus based on one or more characteristics of the one or more received ultrasonic waves. Additionally or alternatively, in some examples, the shaft extends along an axis, and the one or more ultrasonic transducers comprises a plurality of ultrasonic transducers arranged in one or more rows, the one or more rows parallel to the first axis. Additionally or alternatively, in some examples, the shaft includes a plurality of cross-sectional areas orthogonal to the axis, the one or more rows comprise a first row and a second row, one or more of the plurality of cross-sectional areas each comprise a first ultrasonic transducer included in the first row and a second ultrasonic transducer included in the second row, and the method further comprises: transmitting, with the first ultrasonic transducer, the one or more transmitted ultrasonic waves, and sensing, with the second ultrasonic transducer the one or more received ultrasonic waves. Additionally or alternatively, in some examples, the shaft extends along an axis, the shaft includes a plurality of cross-sectional areas orthogonal to the axis, the one or more ultrasonic transducers comprises a plurality of ultrasonic transducers arranged around the circumference of one of the plurality of cross-sectional areas. Additionally or alternatively, in some examples, the shaft extends along an axis, the shaft includes a plurality of cross-sectional areas orthogonal to the axis, an ultrasonic transducer of the one or more ultrasonic transducers is disposed at a distal end opposite the tip of the stylus around the circumference of one of the plurality of cross-sectional areas, and the method further comprises at a first time, generate one of the one or more transmitted ultrasonic waves with the ultrasonic transducer of the one or more ultrasonic transducers, the transmitted ultrasonic wave propagating along the axis; at a second time after the first time, sense one of the one or more sensed ultrasonic waves with the ultrasonic transducer of the one or more ultrasonic transducers; and determining, with the touch controller, the position of the object based on the second time. Additionally or alternatively, in some examples, the one or more characteristics of the one or more sensed ultrasonic waves comprise time of arrival and magnitude. Additionally or alternatively, in some examples, the method further comprises reflecting, with a plurality of ultrasonic barriers, the one or more transmitted ultrasonic waves. Additionally or alternatively, in some examples, the plurality of ultrasonic barriers are coupled to the shaft or etched or embedded in the shaft. Additionally or alternatively, in some examples, the one or more ultrasonic transducers comprise a plurality of ultrasonic transducers, and the method further comprises: transmitting, at a first time, a first of the one or more transmitted ultrasonic waves using a first ultrasonic transducer; and after a delay of a predetermined duration after the first time, transmitting a second of the one or more transmitted ultrasonic waves using a second ultrasonic transducer disposed proximate to the first ultrasonic transducer, wherein the first ultrasonic wave and the second ultrasonic wave produce a directional wave including coherent contributions from the first transmitted ultrasonic wave and the second transmitted ultrasonic wave. Additionally or alternatively, in some examples, the stylus further comprises a wedge coupled to the interior surface of the shaft, wherein at least one of the one or more ultrasonic transducers are mounted to the wedge, and the one or more transmitted ultrasonic waves generated by the one or more ultrasonic transducers is coupled to the surface of the shaft via the wedge.

Although examples have been fully described with reference to the accompanying drawings, it is to be noted that various changes and modifications will become apparent to those skilled in the art. Such changes and modifications are to be understood as being included within the scope of the various examples as defined by the appended claims.

The invention claimed is:

1. A stylus comprising:
a shaft;
a tip coupled to an end of the shaft;
one or more ultrasonic transducers coupled to the shaft, the one or more ultrasonic transducers configured to transmit one or more transmitted ultrasonic waves and to sense one or more sensed ultrasonic waves; and
a touch controller operatively coupled to the one or more ultrasonic transducers, the touch controller configured to generate the one or more transmitted ultrasonic waves and determine a position in at least one dimension of an object touching an exterior surface of the shaft based on one or more characteristics of the one or more sensed ultrasonic waves.

2. The stylus of claim 1, wherein:
the shaft extends along an axis, and
the one or more ultrasonic transducers comprises a plurality of ultrasonic transducers arranged in one or more rows, the one or more rows parallel to the first axis.

3. The stylus of claim 2, wherein:
the shaft includes a plurality of cross-sectional areas orthogonal to the axis,
the one or more rows comprise a first row and a second row,
one or more of the plurality of cross-sectional areas each comprise a first ultrasonic transducer included in the first row and a second ultrasonic transducer included in the second row,
the first ultrasonic transducer is configured to transmit the one or more transmitted ultrasonic waves, and
the second ultrasonic transducer is configured to sense the one or more sensed ultrasonic waves.

4. The stylus of claim 1, wherein:
the shaft extends along an axis,
the stylus shaft includes a plurality of cross-sectional areas orthogonal to the axis,
the one or more ultrasonic transducers comprises a plurality of ultrasonic transducers arranged around the circumference of one of the plurality of cross-sectional areas.

5. The stylus of claim 1, wherein:
the shaft extends along an axis,
the shaft includes a plurality of cross-sectional areas orthogonal to the axis,
an ultrasonic transducer of the one or more ultrasonic transducers is disposed at a distal end opposite the tip around the circumference of one of the plurality of cross-sectional areas,
the ultrasonic transducer is configured to:
at a first time, generate one of the one or more transmitted ultrasonic waves, the transmitted ultrasonic wave propagating along the axis; and
at a second time after the first time, sense one of the one or more sensed ultrasonic waves, and
the touch controller determines the position of the object based on the second time.

6. The stylus of claim 1, wherein the one or more characteristics of the reflected wave comprise one or more of time of arrival and magnitude.

7. The stylus of claim 1, further comprising:
a plurality of ultrasonic barriers configured to reflect the ultrasonic wave.

8. The stylus of claim 7, wherein the ultrasonic barriers are coupled to the shaft or etched or embedded in the shaft.

9. The stylus of claim 1, wherein the one or more ultrasonic transducers comprise a plurality of ultrasonic transducers configured to:
at a first time, transmit a first of the one or more transmitted ultrasonic waves using a first ultrasonic transducer; and
after a delay of a predetermined duration after the first time, transmit a second of the one or more transmitted ultrasonic waves using a second ultrasonic transducer disposed proximate to the first ultrasonic transducer, wherein the first transmitted ultrasonic wave and the second transmitted ultrasonic wave produce a directional ultrasonic wave including coherent contributions from the first transmitted ultrasonic wave and the second transmitted ultrasonic wave.

10. The stylus of claim 1, further comprising:
a wedge coupled to the interior surface of the shaft, wherein at least one of the one or more ultrasonic transducers are mounted to the wedge, and the one or more transmitted ultrasonic waves generated by the one or more ultrasonic transducers is coupled to the surface of the shaft via the wedge.

11. A method for determining a location of an object touching an outside of a stylus comprising a tip and a shaft, the method comprising:
transmitting, with one or more ultrasonic transducers coupled to the shaft, one or more transmitted ultrasonic waves;
receiving, with the one or more ultrasonic transducers, one or more received ultrasonic waves; and
determining, with a touch controller operatively coupled to the plurality of one or more ultrasonic transducers, the position in at least one dimension of the object touching the outside of the stylus based on one or more characteristics of the one or more received ultrasonic waves.

12. The method of claim 11, wherein:
the shaft extends along an axis, and
the one or more ultrasonic transducers comprises a plurality of ultrasonic transducers arranged in one or more rows, the one or more rows parallel to the first axis.

13. The method of claim 12, wherein:
the shaft includes a plurality of cross-sectional areas orthogonal to the axis,
the one or more rows comprise a first row and a second row,
one or more of the plurality of cross-sectional areas each comprise a first ultrasonic transducer included in the first row and a second ultrasonic transducer included in the second row, and
the method further comprises:
transmitting, with the first ultrasonic transducer, the one or more transmitted ultrasonic waves, and
sensing, with the second ultrasonic transducer the one or more received ultrasonic waves.

14. The method of claim 11, wherein:
the shaft extends along an axis,
the shaft includes a plurality of cross-sectional areas orthogonal to the axis,
the one or more ultrasonic transducers comprises a plurality of ultrasonic transducers arranged around the circumference of one of the plurality of cross-sectional areas.

15. The method of claim 11, wherein:
the shaft extends along an axis,
the shaft includes a plurality of cross-sectional areas orthogonal to the axis,
an ultrasonic transducer of the one or more ultrasonic transducers is disposed at a distal end opposite the tip of the stylus around the circumference of one of the plurality of cross-sectional areas, and
the method further comprises:
at a first time, generate one of the one or more transmitted ultrasonic waves with the ultrasonic transducer of the one or more ultrasonic transducers, the transmitted ultrasonic wave propagating along the axis;
at a second time after the first time, sense one of the one or more sensed ultrasonic waves with the ultrasonic transducer of the one or more ultrasonic transducers; and
determining, with the touch controller, the position of the object based on the second time.

16. The method of claim 11, wherein the one or more characteristics of the one or more sensed ultrasonic waves comprise time of arrival and magnitude.

17. The method of claim 11, further comprising:
reflecting, with a plurality of ultrasonic barriers, the one or more transmitted ultrasonic waves.

18. The method of claim 17, wherein the plurality of ultrasonic barriers are coupled to the shaft or etched or embedded in the shaft.

19. The method of claim 11, wherein the one or more ultrasonic transducers comprise a plurality of ultrasonic transducers, and the method further comprises:
transmitting, at a first time, a first of the one or more transmitted ultrasonic waves using a first ultrasonic transducer; and
after a delay of a predetermined duration after the first time, transmitting a second of the one or more transmitted ultrasonic waves using a second ultrasonic transducer disposed proximate to the first ultrasonic transducer, wherein the first ultrasonic wave and the second ultrasonic wave produce a directional wave including coherent contributions from the first transmitted ultrasonic wave and the second transmitted ultrasonic wave.

20. The method of claim 11, wherein the stylus further comprises a wedge coupled to the interior surface of the shaft, wherein at least one of the one or more ultrasonic transducers are mounted to the wedge, and the one or more transmitted ultrasonic waves generated by the one or more ultrasonic transducers is coupled to the surface of the shaft via the wedge.

* * * * *